United States Patent [19]
Leppo

[11] Patent Number: 5,744,939
[45] Date of Patent: Apr. 28, 1998

[54] TEMPERATURE COMPENSATION MONITORING CIRCUIT FOR A BATTERY PACK CHARGING APPARATUS

[75] Inventor: Lee E. Leppo, Tallmadge, Ohio

[73] Assignee: Telxon Corp., Akron, Ohio

[21] Appl. No.: 708,468

[22] Filed: Sep. 5, 1996

[51] Int. Cl.[6] .................................................. H01M 10/46
[52] U.S. Cl. ................................................................ 320/153
[58] Field of Search .................................. 320/22, 23, 32, 320/35, 37, 39, 128, 144, 150, 153, 160, 155

[56] References Cited

U.S. PATENT DOCUMENTS

| | | | |
|---|---|---|---|
| 3,852,652 | 12/1974 | Jasinski | 320/35 |
| 3,867,681 | 2/1975 | Bishop et al. | 320/21 |
| 3,895,283 | 7/1975 | Peterson | 320/35 |
| 4,433,277 | 2/1984 | Carollo et al. | 320/24 |
| 4,727,306 | 2/1988 | Misak et al. | 320/35 |
| 5,057,762 | 10/1991 | Goedken et al. | . |
| 5,121,047 | 6/1992 | Goedken et al. | . |
| 5,122,722 | 6/1992 | Goedken et al. | . |
| 5,166,596 | 11/1992 | Goedken | . |
| 5,180,962 | 1/1993 | Giancaterino et al. | 320/35 |
| 5,343,137 | 8/1994 | Kitaoka et al. | 320/13 |
| 5,561,361 | 10/1996 | Sangupta et al. | 320/35 X |

OTHER PUBLICATIONS

Sixteen page product specification No. LT1511 published by Linear Technology, Constant–Current/Constant–Voltage 3A Battery Charger with Input Current Limiting, published Oct., 1995.

Primary Examiner—Edward Tso
Attorney, Agent, or Firm—Watts, Hoffman, Fisher & Heinke Co., L.P.A.

[57] ABSTRACT

A monitoring circuit for a Li-Ion battery pack charging apparatus is disclosed. The monitoring circuit modifies charging time for a Li-Ion battery pack inserted in the charging apparatus to compensate for temperature effects on the charging current input to the battery pack. In one embodiment of the monitoring circuit, a comparator is utilized to compare a voltage across the battery pack, $V_{charge}$, to a set point voltage value, $V_{sp}$. The set point voltage value, $V_{sp}$, is taken off a temperature sensor circuit comprising a voltage divider circuit. The voltage divider circuit includes at least one thermistor in a ground connected leg of the divider. In a second embodiment of the monitoring circuit of the present invention, a differential amplifier is coupled to opposite ends of a low resistance sensor resistor. The sensor resistor is coupled between charging circuitry and the Li-Ion battery pack to be charged. The voltage differential across the resistor, $V_{sensor}$, is amplified by a gain of the differential amplifier. A gain adjusted differential voltage, $V_{gsensor}$, is compared by a microprocessor to a set point voltage value, $V_{sp}$. The set point voltage value, $V_{sp}$, is generated by a temperature sensor circuit. The temperature sensor circuit includes a voltage divider circuit and the set point voltage value, $V_{sp}$, is taken off the voltage divider which includes at least one thermistor in a ground connected leg of the divider.

14 Claims, 2 Drawing Sheets

TEMPERATURE COMPENSATION MONITORING CIRCUIT FOR A BATTERY PACK CHARGING APPARATUS

FIELD OF THE INVENTION

This invention relates to a monitoring circuit for a battery pack charging apparatus and, more particularly, to a battery pack charging apparatus monitoring circuit which modifies charging time as a function of a temperature of the battery pack being charged.

BACKGROUND OF THE INVENTION

Rechargeable battery packs comprising one or more rechargeable battery cells are widely used to supply power to a variety of portable electronic devices. Rechargeable battery packs save a purchaser of a device the cost of continuously purchasing replacement batteries over the useful life of the device. Additionally, environmental concerns relating to disposal of non-rechargeable batteries also point to increasing use of rechargeable batteries in the future. A number of chemical compositions have been proposed for rechargeable battery cells including nickel-cadmium (Ni—Cd), lithium-ion (Li-Ion) and nickel-metal hydroxide (sometimes referred to as nickel-metal hydride) (Ni-MH).

Each type of battery cell has different recharging requirements. To maximize the energy available from a battery pack after recharging, the battery pack needs to be fully charged during the recharging process. Li-Ion battery cells have proven to be very efficient in terms of watt-hours per unit volume of the cell and high output voltage. Additionally, Li-Ion cells exhibit a long useful life. Thus, battery packs comprising one or more Li-Ion cells have found increasing use in a variety of portable data collection devices requiring a compact, higher voltage power supply. For example, the Model No. 18650 Li-Ion battery cell available from Moli Energy of Maple Ridge, British Columbia, Canada has a 4.1 volt output voltage potential when the cell is fully charged. The cell is considered discharged when the output voltage potential drops to 2.5 volts. During charging of a Li-Ion battery cell, the charging current through the cell must be limited. In the case of the Moli Energy Li-Ion cell, charging current must be limited to a maximum of 1.2 amps, otherwise damage to the cell may result.

In typical applications, two Li-Ion battery cells are disposed in a casing and electrically coupled in series to form a rechargeable Li-Ion battery pack. The battery pack is sized to fit in a battery pack receiving opening of an electronic device. During use of the device, the battery pack gradually discharges as it supplies power to electronics of the device. When the power supplied by the pack falls below a threshold value, the pack is removed from the device and recharged using a recharging apparatus.

A discharged Li-Ion battery cell has a very low charging impedance. Therefore, when such a cell is first inserted or docked in a charging station of a charging apparatus, the charging current, $I_{charge}$, must be limited to a maximum charging current, $I_{max}$, for that cell to avoid damaging the cell. Initially, the Li-Ion cell is charged at $I_{charge}=I_{max}$ and the low cell charging impedance results in a charging voltage, $V_{charge}$, across the cell being significantly less than the maximum rated output voltage, $V_{max}$, of the cell, i.e., $V_{charge} \ll V_{max}$. The charging voltage, $V_{charge}$, at any time is approximately equal to the voltage of the cell, $V_{batt}$, that is, the voltage across the positive and negative terminals of the cell.

During the charging process, chemical reactions within a Li-Ion cell cause the charging impedance of the cell to increase. As the cell charging impedance increases, the charging voltage, $V_{charge}$, will increase proportionately with cell charging impedance until the charging voltage $V_{charge}=V_{max}$. The time required for the charging voltage, $V_{charge}$, to reach $V_{max}$ is commonly referred to as the crossover time, $t_{crossover}$. This is shown in FIG. 1 which plots the charging voltage, $V_{charge}$, across a typical Li-Ion battery cell and charging current, $I_{charge}$, through the cell when the cell temperature is 25 degrees Celsius (77 degrees Fahrenheit).

After time $t_{crossover}$ is reached, the charging apparatus continues to charge the cell at $V_{charge}=V_{max}$ until the cell is charged to 100% of full charge capacity. Since the cell charging impedance continues to increase at a decreasing exponential rate as the cell charges, $I_{charge}$ decreases exponentially as shown in FIG. 1 until the cell is fully charged.

Typical current art Li-Ion battery pack charging apparatuses charge a battery pack in two steps or stages. In the first stage or stage 1 of the charging process, the apparatus charges the pack to 90% to 95% of the pack's full charge capacity. In the second stage or stage 2 of the charging process a timer is set causing the charging apparatus to charge the pack for an additional predetermined time period, for example, an additional three hours. An indicator light is actuated at the completion of stage 1 of the charging process. The idea behind the two stage charging process is to quickly charge the pack to a 90–95% charged condition so that the pack is nearly fully charged and can be used, if necessary, after completion of the first stage in a portable electronic device. The actuation of the indicator light alerts a user that the battery pack is ready for use, that is, the pack is at least 90–95% charged. In the second stage of the charging process, the additional three hours of charging supplies the additional 5% to 10% of charging energy necessary to bring the pack to a fully charged capacity or condition.

At 25 degrees Celsius, the 90–95% charged condition for a 4.1 volt Li-Ion cell is reached after approximately 1½ hours of charging, meaning that the total charging time is approximately 4½ hours (1½ hours in stage 1 +3 hours in stage 2). Thus, the cell would be available for use with 90–95% of the energy of a fully charged condition after 1½ hours of charging.

Current art battery pack charging apparatuses include monitoring circuits which monitor the charging current, $I_{charge}$, through a battery pack and compare $I_{charge}$ to a fixed value or predetermined set point charging current, $I_{sp}$. For a Li-Ion battery pack, the fixed value is normally set at the value of charging current corresponding to a 90–95% charged condition of the battery pack. Thus, the first stage of the charging process continues until the charging current, $I_{charge}$, drops to the set point charging current, $I_{sp}$, of the battery pack. When the charging apparatus monitoring circuit determines that $I_{charge}$ has fallen below the charging current set point, $I_{sp}$, the 90% indicator light is actuated and second stage of the charging process begins as a timer is set causing the charging apparatus to charge the battery pack at $V_{max}$ for an additional three hours to achieve a fully charged battery pack condition (100% charged).

Unfortunately, the charging characteristics of an Li-Ion cell is highly dependent on battery cell temperature. It has been found that the charging current and the charging voltage characteristic curves vary as a function of the temperature of the battery pack during the recharging process. The temperature of the battery pack, in turn, is a function of the ambient temperature in the area surrounding the battery pack. In FIG. 2, approximate charging characteristic curves of typical a 4.1 volt Li-Ion cell are illustrated. The labels identifying the curves are defined as follows:

$I(0)=I_{charge}$ curve when the cell is at 0° C.

$I(25)=I_{charge}$ curve when the cell is at 25° C.

$V(0)=V_{charge}$ curve when the cell is at 0° C.

$V(25)=V_{charge}$ curve when the cell is at 25° C.

Looking at the horizontal or charging time axis, the time labeled $t_{90}(25)$ represents a charging time at which the cell is charged to 90 to 95% of full charge capacity at 25 degrees Celsius. As noted above, the time $t_{90}(25)$ is approximately 1½ hours. Typically, the predetermined charging current set point, $I_{sp}$, is set at a charging current value that corresponds to a charging time $t_{90}(25)$ as is shown in FIG. 2 ($I_{sp}$ is approximately equal to 0.20 amps or 200 milliamps). The time labeled $t_{90}(0)$ represents a charging time at which the cell is charged to 90 to 95% of full charge capacity at 0 degrees Celsius. As can be seen, the time $t_{90}(0)$ is approximately 3 hours. The longer time required to reach the 90–95% charge condition at 0 degrees Celsius results from decreased charging power supplied by the charging apparatus over most of the charging period (charging power supplied=$I_{charge} \times V_{charge}$). The time at which the cell is being charged at a charging current of $I_{charge}=I_{max}$ is decreased at lower battery cell temperatures because the charging current characteristic curve for the cell shifts to the left. Even though the charging voltage $V_{charge}$ rises to $V_{max}$ more quickly, that is, $t_{crossover}$ is achieved at an earlier time, this is not enough to offset the decrease in $I_{charge}$.

A charging current set point of $I_{sp}=200$ milliamps will provide a charging time that results in a 90–95% charged condition of the battery cell at a temperature of 25 degrees Celsius. However, if the battery cell temperature is less than 25 degrees Celsius, the charging current characteristic curve at the lower temperature will be shifted to the left. Thus, the charging time at which the charging current, $I_{charge}$, drops below the predetermined charging current set point, $I_{sp}$, will also be less. In the case where the battery cell temperature is 0 degrees Celsius, the charging time at which $I_{charge} < I_{sp}$ labeled $t_e$ in FIG. 2 is approximately ¾ hour. Recall that at 0 degrees Celsius, the charging time $t_{90}(0)$ at which the battery cell is 90–95% charged is approximately 3 hours.

Thus, with a battery cell temperature of 0 degrees Celsius, a current art charging apparatus monitoring circuit utilizing a predetermined fixed charging current set point of $I_{sp}=200$ milliamps would end stage one charging after ¾ hour of charging when, in fact, stage one charging should continue for another 2¼ hours. Additionally, the monitoring circuit would cause the indicator light to actuate at the completion of stage 1 charging (¾ hour) thus falsely informing a user that the cell is 90–95% charged when in fact the cell may not be even 50% charged. Moreover, in stage 2 of the charging process the three hour timer will be set causing the cell to be charged for an additional three hours at a charging voltage of $V_{max}$. This will result in an incomplete charge of the cell.

Therefore, what is needed is a battery pack recharging apparatus including monitoring circuitry which can modify charging time to compensate for changing temperature effects on a charging rate of an Li-Ion battery pack.

SUMMARY OF THE INVENTION

A monitoring circuit for a Li-Ion battery pack charging apparatus is disclosed. The monitoring circuit modifies charging time for a Li-Ion battery pack inserted in the charging apparatus to compensate for temperature effects on the charging current input to the battery pack. Two embodiments of the monitoring circuit are presented. Both circuits monitor the charging current, $I_{charge}$, through the battery pack and compare the charging current to a charging current set point, $I_{sp}$, which corresponds to a 90–95% charged condition of the battery pack. Unlike current art monitoring circuits, the charging current set point, $I_{sp}$, of the monitoring circuits of the present invention are dynamic, that is, $I_{sp}$ varies as a function of battery pack temperature. As the battery pack temperature decreases, the charging current set point, $I_{sp}$, also decreases.

In one embodiment of the monitoring circuit, a comparator is utilized to compare the charging current $I_{charge}$ to the charging current set point, $I_{sp}$. Operationally, a charging voltage, $V_{charge}$, output by charging circuitry of the charging apparatus, is dropped across the battery pack in series with a sensor resistor. Thus, the battery pack voltage, $V_{batt}$, is slightly less than the charging voltage, $V_{charge}$, due to the voltage drop across the sensor resistor, $V_{sensor}$. That is, $V_{charge}=V_{batt}+V_{sensor}$. The charging voltage, $V_{charge}$, is also applied across a voltage divider circuit which includes at least one thermistor in a ground connected leg of the divider. A thermistor is a resistive element having a negative temperature coefficient of resistivity meaning that, as the temperature of the thermistor increases, its resistance decreases. The battery pack voltage, $V_{batt}$, is coupled to an inverting input of the comparator while a set point voltage value, $V_{sp}$, taken off a node of the voltage divider circuit is coupled to a noninverting input of the comparator.

Initially, when charging commences, the set point voltage value, $V_{sp}$, will exceed the battery pack voltage, $V_{batt}$, because of the voltage drop across the sensor resistor, $V_{sensor}$, and the comparator output will be high. As the charging continues and the charging current, $I_{charge}$, begins to decrease, the voltage drop across the sensor resistor, $V_{sensor}$, will also decrease. Thus, $V_{charge}$, which is equal to the sum of $V_{batt}$ and $V_{sensor}$ will drop. This, in turn, will cause set point voltage value, $V_{sp}$, to decrease. At a point in time where the battery pack is at a 90–95% charged condition, the battery pack voltage, $V_{batt}$, will exceed the set point voltage value, $V_{sp}$, causing the output of the comparator to go low.

When the output of the comparator goes low, a first stage of the charging process is complete and the monitoring circuitry cause and indicator light emitting diode (LED) to be actuated and a timer to be set resulting in additional charging of the battery pack for a predetermined timer, e.g., three hours.

The set point voltage value, $V_{sp}$ is directly proportional to the dynamic charging current set point, $I_{sp}$, and functions as a surrogate for $I_{sp}$ in the monitoring circuit. As battery pack temperature decreases, the charging current set point, $I_{sp}$, should decrease to reflect the fact that the charging current characteristic curve will shift to the left and charging current, $I_{current}$, through the battery pack will decrease. Because of the at least one thermistor in the ground connected leg of the voltage divider, the set point voltage value, $V_{sp}$, will decrease with a decrease of battery pack ambient temperature.

In a second embodiment of a monitoring circuit of the present invention, a differential amplifier is coupled to opposite ends of a low resistance sensor resistor coupled between the charging circuitry and the battery pack inserted in the charging apparatus to be charged. The voltage drop across the sensor resistor, $V_{sensor}$, is amplified by a gain of the differential amplifier. A gain adjusted sensor resistor voltage drop, $V_{gsensor}$, is coupled to one input of an analog to digital (A/D) converter. Also input to the A/D converter is a set point voltage value, $V_{sp}$. The set point voltage value, $V_{sp}$, is taken off a voltage divider which includes at least one thermistor in a ground connected leg of the divider. Because of the thermistor, the set point voltage value, $V_{sp}$, varies as a function of the ambient temperature of the battery pack. The digital outputs of the A/D converter corresponding to the analog values of $V_{gsensor}$ and $V_{sp}$ are input to a microprocessor. The microprocessor continuously compares the digitized values. When $V_{gsensor}$ drops below $V_{sp}$, the battery pack is 90–95% charged and the first stage of the charging process is complete. The monitoring circuit actuates an indicator LED and a timer is set causing the charging circuitry to continue charging the battery pack for an additional three hours thereby fully charging the battery pack.

Both of the battery charging apparatus monitoring circuits of the present invention provide for comparing the charging current through the battery pack to a dynamic charging current set point value, $I_{sp}$. The charging current set point value, $I_{sp}$, varies as a function of ambient battery pack temperature to insure that the pack is charged to 90–95% charge capacity by the charging circuitry in a first stage of the charging process and charged to a fully charged condition by the end of a second stage of the charging process.

These and other advantages and features of this invention will be clearly understood through consideration of the following detailed description of the invention in conjunction with the accompanying drawings.

DETAILED DESCRIPTION

Figure 3:
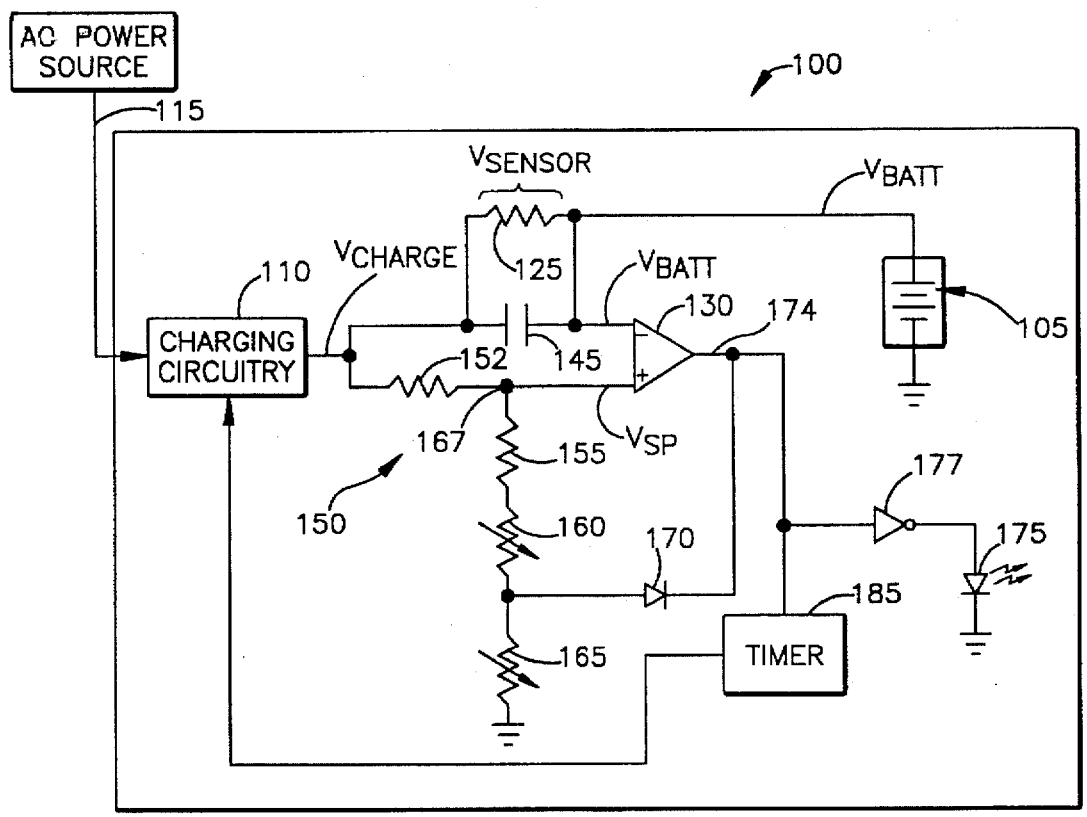
FIG. 3 is a schematic circuit diagram of a battery pack charging apparatus monitoring circuit of the present invention.
Figure 4:
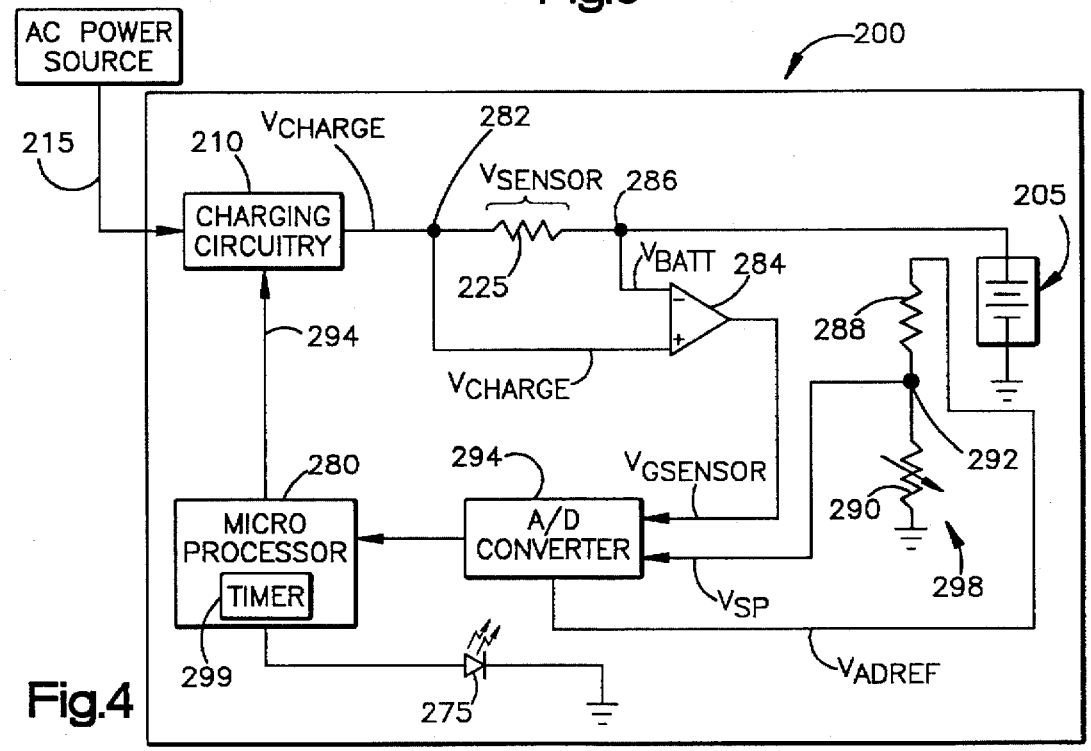
FIG. 4 is a schematic circuit diagram of an alternate embodiment of a battery pack charging apparatus monitoring circuit of the present invention.

A schematic representation of a battery charging apparatus is shown generally at 100 in FIG. 3. The apparatus 100 is suitable for recharging a Li-Ion battery pack 105 and includes charging circuitry 110 which receives power from an alternating current (AC) source 115, e.g., a 120 volt AC household outlet, and, in turn, produces a regulated direct current (DC) power output for charging the battery pack 105. A monitoring circuit of the present invention is shown generally at 120 in FIG. 3. The monitoring circuit 120 includes a sensor resistor 125 and a comparator 130. The sensor resistor 125 is coupled between the charging circuitry 110 and the battery pack 105. An end of the sensor resistor 125 coupled to the battery pack 105 is also coupled to an inverting input of the comparator 130. Suitable values for components of the monitoring circuit 120 will be provided assuming that the battery pack 105 is comprised of two 4.1 volt Moli Energy Li-Ion battery cells connected in series. It should be appreciated, of course, that appropriate circuitry values for battery packs having a different number of Li-Ion cells and/or different size Li-Ion cells and/or different electrical connection (parallel vs. series) between the Li-Ion cells may be determined empirically.

The sensor resistor 125 is a low resistance resistor having a value of approximately 0.18 ohms, while a suitable comparator is the Model No. LM393 sold by National Semiconductor of Santa Clara, Calif. A 0.1 microfarad filtering capacitor 145 is coupled in parallel with the sensor resistor 125 to filter out any stray voltage spikes output by the charging circuitry 110.

The charging circuitry 110 outputs a charging voltage, $V_{charge}$, and a charging current, $I_{charge}$, flows through the sensor resistor 125 and the battery pack 105. At any time in the charging process, the charging voltage, $V_{charge}$, is equal to the sum of a voltage across the battery pack, $V_{batt}$, plus a voltage drop across the sensor resistor, $V_{sensor}$. The battery pack voltage, $V_{batt}$, is input to an inverting input of the comparator 130. The monitoring circuit 120 further includes a temperature sensor circuit which generates a temperature varying set point voltage value, $V_{sp}$. Preferably, the temperature sensor circuit comprises a voltage divider circuit 150. The set point voltage value, $V_{sp}$, is taken off a node 157 of the voltage divider circuit 150 and is coupled to a noninverting input of the comparator. The voltage divider circuit 150 is comprised of a 1.5 kohm resistor 152 coupled in series with a 150 kohm resistor 155. The 150 kohm resistor 155, in turn, is series coupled to a first temperature sensor, preferably, a first thermistor 160 which is series coupled to ground through a second temperature sensor, preferably, a thermistor 165. The thermistors 160, 165 function as temperature sensors. The input impedance of the comparator 130 is very high so substantially no current flows through the comparator. Further, the resistance values of two series coupled resistors 152, 155 in the voltage divider circuit 150 are 1.5 kohms and 150 kohms respectively. Thus, little current flows through the voltage divider circuit 150.

The comparator 130 essentially is measuring the charging current, $I_{charge}$ and comparing it to a charging current set point value, $I_{sp}$, which changes as a function of temperature. The set point voltage value, $V_{sp}$, is directly proportional to the dynamic charging current set point, $I_{sp}$, and functions as a surrogate for $I_{sp}$ in the monitoring circuit. Further, the voltage drop across the sensor resistor, $V_{sensor}$ is directly proportional to the charging current, $I_{charge}$, through the battery pack 105 decreases. As will be discussed below, as the temperature of the battery pack 105, the charging current set point, $I_{sp}$, should decrease to reflect the fact that the charging current characteristic curve for the battery pack will shift to the left and charging current, $I_{current}$, through the battery pack will decrease. Because of the thermistors 160, 165 in the ground connected leg of the voltage divider circuit 150, the set point voltage value, $V_{sp}$, will increase with a decrease of battery pack ambient temperature.

Operationally, the comparator 130 compares $V_{batt}$ and $V_{sp}$ and has an output 174 which varies between two states, high (+5 volts) and low (essentially 0 volts) depending on the outcome of the comparison. The output 174 of the comparator 130 is coupled to a timer 185 of the monitoring circuit 120 which, in turn, is coupled to the charging circuitry 110. The comparator output 174 is also coupled to an inverter 177 which is coupled to a light emitting diode (LED) 175. When the comparator output 174 goes low, the LED 175 is actuated.

The output 174 of the comparator 130 regulates the charging process as follows:

| Condition | Comparator Output | Result |
|---|---|---|
| $V_{sp} > V_{batt}$ | High | Continue charging pack until 90% charge is achieved (stage 1) |
| $V_{sp} < V_{batt}$ | Low | Actuate timer for 3 hours of charging to achieve 100% charge and actuate light emitting diode (stage 2) |

During a first stage (stage 1) of the charging process, it is desired to charge the battery pack 105 to 90–95% of its full capacity charge or fully charged condition. During the second stage (stage 2) of the charging process, it is desired to charge the battery pack 105 from the 90–95% charge level to a fully charged condition, which takes an additional three hours of charging by the charging circuitry 110 at a charging voltage $V_{charge}=V_{max}$. Stage 1 of the charging process continues so long as the comparator output 174 is high. During stage 1, the charging current, $I_{charge}$, starts at $I_{charge}=I_{max}$ and gradually decreases to the charging current set point value, $I_{sp}$. When the charging current, $I_{charge}$, falls below the charging current set point value, $I_{sp}$, the battery pack 105 is between 90 to 95% charged.

When the comparator output 174 goes low and the second stage of the charging process is initiated, the LED 175 is actuated so that a potential user of the battery pack 105 is made aware that the pack is 90–95% charged and may be removed from the charging apparatus 100 and used in a portable electronic device. Also, when the comparator output 174 goes low, the timer 186 is set for three hours causing the charging circuitry 110 to charge the battery pack 105 for an additional three hours so that the pack is fully charged.

Initially, when the charging process starts, $I_{charge}$ is set to $I_{max}$, which for this particular battery pack 105 is 1.2 amps or 1200 milliamps. As the first stage of the charging process continues past a charging time $t_{crossover}$, the charging impedance of the battery pack 105 increases causing the battery pack voltage, $V_{batt}$, to increase to the maximum output voltage, $V_{max}$, of the battery pack. After the charging time $t_{crossover}$, the charging current, $I_{charge}$, will decrease as charging impedance of the battery pack 105 continues to increase. The charging current set point value, $I_{sp}$, is the magnitude of the charging current, $I_{charge}$, at which the battery pack is 90–95% charged. The charging current set point value, $I_{sp}$, is dependent on the temperature of the battery pack. Empirically, it has been determined that the following charging current set point values approximately corresponding to a battery pack charging condition of between 90 and 95% of full charge capacity:

| Battery Pack Temp (°C.) | Charging Current Set Point Value (milliamps) |
|---|---|
| −30 | 19.2 |
| −20 | 33.9 |
| −10 | 56.4 |
| 0 | 88.2 |
| +10 | 129.3 |
| +20 | 177.2 |
| +25 | 202.4 |
| +30 | 227.6 |
| +40 | 276.1 |
| +50 | 319.0 |
| +60 | 354.6 |
| +70 | 382.8 |

As noted above, the voltage divider circuit 150 consists of the 1.5 kohm resistor 152, the 150 kohm resistor 155, the first thermistor 160 and the second thermistor 165. A suitable thermistor for the first and second thermistors 160, 165 is the Model No. 1H1003-5 sold by Dale Electronics of Norfolk, Nebr. The resistance of the first and second thermistors 160, 165 vary inversely with increasing temperature as follows:

| Thermistor Temp (°C.) | Resistance (kohms) |
|---|---|
| −30 | 1770.0 |
| −20 | 971.2 |
| −10 | 553.4 |
| 0 | 326.6 |
| +10 | 199.0 |
| +20 | 124.9 |
| +25 | 100.0 |
| +30 | 80.6 |
| +40 | 53.3 |
| +50 | 36.0 |
| +60 | 24.9 |
| +70 | 17.5 |

The thermistors 160, 165 are positioned in close proximity to the battery pack 105 so that as the temperature of the battery pack changes the temperature of the thermistors correspondingly changes.

When charging of the battery pack 105 by the charging circuitry 110 commences in stage 1, the charging current is high, $I_{charge}=I_{max}$ and the battery pack voltage, $V_{batt}$, is low. Further, at a high charging current, the voltage drop, $V_{sensor}$, across the sensor resistor 125 is relatively large. The charging voltage, $V_{charge}$, is necessarily higher than the battery pack voltage, $V_{batt}$, because of the voltage drop $V_{sensor}$. That is, $V_{charge}=V_{batt}+V_{sensor}$. Further the set point voltage value, $V_{sp}$, taken off node 167 of the voltage divider circuit 150 is equal to:

$V_{sp}$ = $V_{charge}$ × [(resistance of resistor 155 +
resistance of thermistor 160 +
resistance of thermistor 165)/ (resistance of resistor 152 +
resistance of resistor 155 + resistance of thermistor 160 +
resistance of thermistor 165)]

Thus, the set point voltage value, $V_{sp}$, is close to the charging voltage, $V_{charge}$ and $V_{sp}>V_{batt}$ so the output 174 of the comparator 130 will be high.

As the battery pack 105 continues to be charged to time $t_{crossover}$, the battery pack voltage, $V_{batt}$, will increase to the maximum output voltage of the battery pack, $V_{max}$. However, since the charging current, $I_{charge}$, is still high at time $t_{crossover}$, the voltage drop, $V_{sensor}$, across the sensor resistor 125 is still relatively large and $V_{charge}$ exceeds $V_{batt}$ by an amount great enough such that $V_{sp}>V_{batt}$ and the output 174 of the comparator 130 will remain high and stage 1 of the charging process continues.

Figure 1:
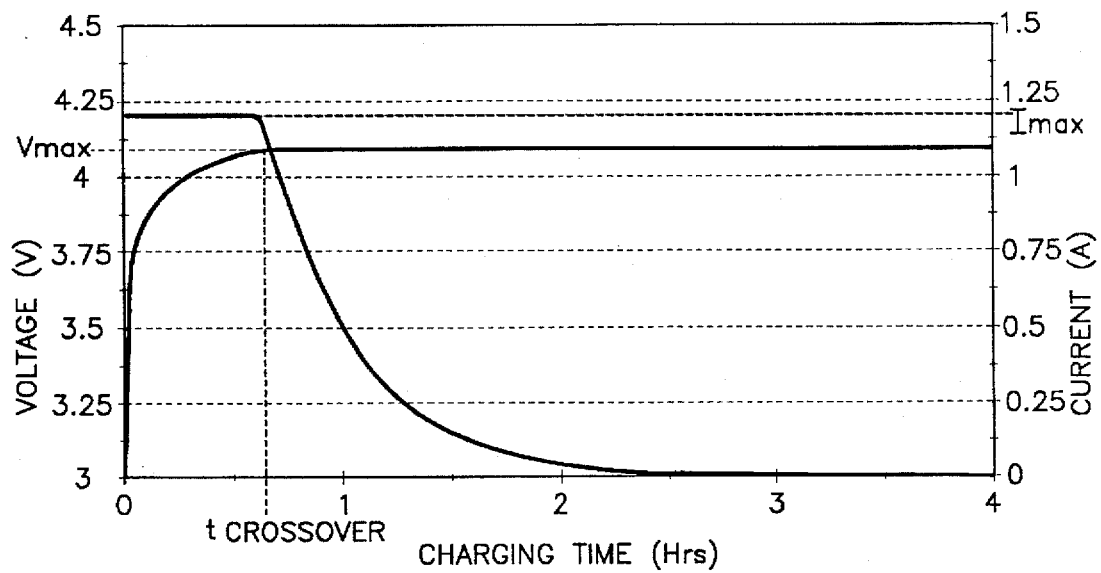
FIG. 1 is a graph depicting charging current and voltage characteristic curves of a Li-Ion battery cell as a function of time.
Figure 2:
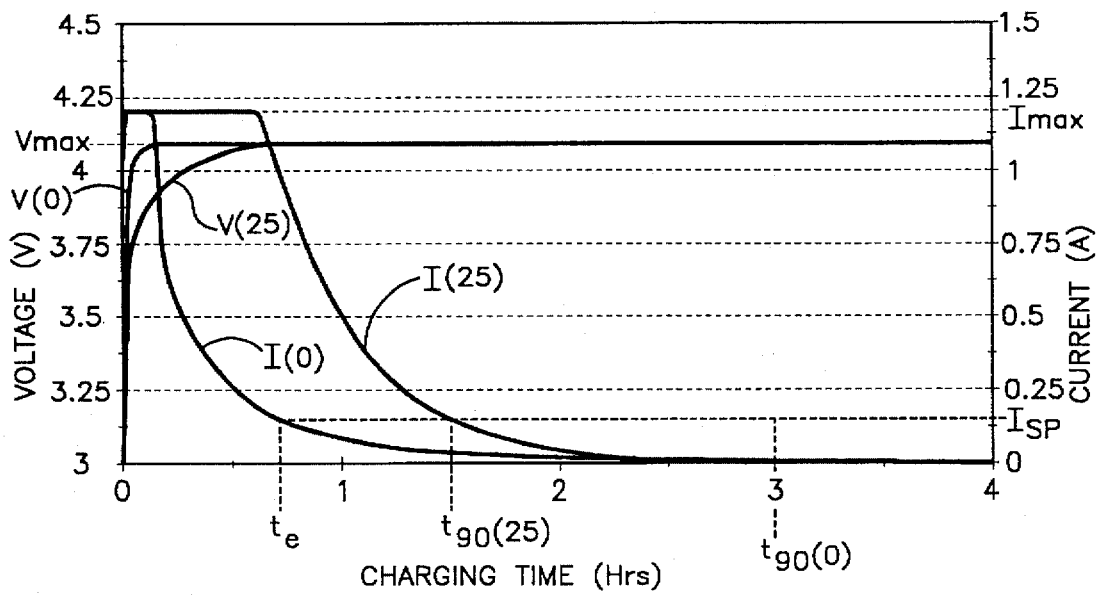
FIG. 2 is a graph depicting charging current and voltage characteristic curves of a Li-Ion battery cell as a function of time at two different battery cell temperatures.

After time $t_{crossover}$, the charging current, $I_{charge}$, will decease as is illustrated in FIGS. 1 and 2 following substantially a decaying exponential curve. As $I_{charge}$ decreases, the voltage drop, $V_{sensor}$, across the sensor resistor 125 will correspondingly decrease and the amount by which $V_{charge}$ exceeds $V_{batt}$ will decrease. The resistance values of the resistor and thermistor resistances in the voltage divider circuit 150 and the sensor resistor 125 have been selected such that, for any battery pack temperature (within the limits of −30 to +70 degrees Celsius), the set point voltage value, $V_{sp}$, will be exceeded by the battery pack voltage, $V_{batt}$, when the battery pack 105 has been charged to between 90 to 95% of full capacity charge. The variability of resistances of the thermistors 160, 165 cause the set point voltage value, $V_{sp}$, to vary as a function of battery pack temperature such that no matter what the battery pack temperature (within the limits of −30 to +70 degrees Celsius), the threshold charging time where $V_{batt} > V_{sp}$ and the output 174 of the comparator goes low will occur when the battery pack 105 is 90 to 95% charged. This threshold charging time is also the time at which the charging current, $I_{charge}$, falls below the charging current set point value, $I_{sp}$. Thus, in essence, the comparator 130 is functioning to monitor the charging current, $I_{charge}$, and comparing it to the charging current set point value, $I_{sp}$.

When the comparator output 174 goes low, the first stage of the charging process is complete and the second stage of the process begins. When the comparator output 174 goes low, the timer 185 is actuated and causes the charging circuitry 110 to charge the battery pack 105 for an additional three hours at a charging voltage $V_{charge} = V_{max}$ (8.2 volts) so that the battery pack charge increases to its fully charged condition. When the comparator output 174 goes low, an output of the inverter 177 goes high and actuates the LED 175. Actuation of the LED 175 signal to a potential user of the battery pack 105 that the pack has achieved a 90–95% charge and can be removed from the charging apparatus 100 and used at any time. The LED 175 remains on until the battery pack 105 is removed from the charging apparatus 100.

In order to provide a hysteresis loop, an anode of a diode 170 is coupled to a node 172 coupling the thermistors 160, 165. A cathode end of the diode 170 is coupled to an output 174 of the comparator 130. As is well known in the art, providing a hysteresis loop helps to debounce the output 174 of the comparator 130, that is, it prevents the comparator 130 from rapidly oscillating between low and high output states when the values of $V_{sp}$ and $V_{batt}$ are very close and small noise induced voltage fluctuations in $V_{sp}$ and/or $V_{batt}$ would otherwise cause the comparator to switch rapidly between output states.

A second embodiment of a monitoring circuit of the present invention is shown generally at 220 in FIG. 3. For simplicity, components or systems identical to corresponding components or systems described with respect to the first embodiment (FIG. 2) will be assigned reference number which have the same last two digits, e.g., monitoring circuit 120 of the FIG. 2 embodiment corresponds to monitoring circuit 220 of FIG. 3. The monitoring circuit 220 is part of a battery charging apparatus 200 suitable for recharging a Li-Ion battery pack 205. The apparatus 200 includes charging circuitry 210 which receives power from an alternating current (AC) source 215, e.g., 120 volt AC household outlet, and, in turn, produces a regulated direct current (DC) power output for charging the battery pack 205.

The monitoring circuit 220 includes a sensor resistor 225, a microprocessor 280, a differential amplifier 284, an analog to digital (A/D) converter 294, and a temperature sensor circuit. The temperature circuit preferably comprises a voltage divider circuit 298. The sensor resistor 225 has a resistance value of 0.1 ohms. A suitable microprocessor 280 is the Motorola 68HC11FI microprocessor and a suitable differential amplifier 284 is the Model No. LM358 produced by National Semiconductor. A suitable A/D converter is the Model No. MAX188 sold by Maxim Corp. of Sunnyvale, Calif.

The sensor resistor 125 is coupled between the charging circuitry 210 and the battery pack 205. A node 282 coupling an end of the resistor 225 and the charging circuitry 210 is coupled to a noninverting input of the differential amplifier 284. A node 286 coupled an opposite end of the resistor 225 and the battery pack 225 is coupled to an inverting input of the differential amplifier 284.

As was noted above with respect to the first embodiment of the monitoring circuit, the voltage drop, $V_{sensor}$, across the sensor resistor 225 is dependent on the charging current, $I_{charge}$, through the battery pack 205. Thus, the input to the differential amplifier 284, $V_{sensor}$, is proportional to the charging current, $I_{charge}$. Also, it is true that, a charging voltage, $V_{charge}$, output by the charging circuitry 210 is greater than a voltage across the battery pack, $V_{batt}$, that is, $V_{charge} = V_{batt} + V_{sensor}$. When the charging current, $I_{charge}$, has dropped to a charging current set point value, $I_{sp}$, corresponding to a 90 to 95% charged condition of the battery pack 205, a first stage of the charging process has ended. The charging current set point value, $I_{sp}$, is dependent on battery cell temperature. As was the case in the first embodiment of the monitoring circuit, a set point voltage value, $V_{sp}$, also dependent on temperature will be used as a surrogate for the charging current set point value, $I_{sp}$. The sensor resistor voltage drop, $V_{sensor}$, will be used as a surrogate for charging current, $I_{charge}$.

The sensor resistor voltage drop, $V_{sensor}$, is amplified by a gain factor of the differential amplifier 284 generating a gain adjusted sensor resistor voltage drop, $V_{gsensor}$. A suitable gain factor for the differential amplifier is 40. The gain adjusted voltage drop, $V_{gsensor}$, is input to the A/D converter 294 where it is digitized and output to the microprocessor 280. Also input to the A/D converter and digitized is the set point voltage value, $V_{sp}$, taken off a node 292 of the voltage divider circuit 298.

The voltage divider circuit 298 is comprised of a resistor 288 coupled in series with a temperature sensor, preferably, a thermistor 290. A suitable resistance value for the resistor 280 is 178 kohms while a suitable thermistor 290 is the Model No. 1H1003-5 available from Dale Electronics. The resistance characteristics of the thermistor 290 was presented in the description of the first embodiment. A voltage, $V_{adref}$, applied across the voltage divider circuit 298 is +5 volt DC taken off an output of the A/D converter 294. The thermistor 290 is placed in close proximity to the battery pack 205 so that the temperature of the thermistor and battery pack are substantially identical and the battery pack temperature determines the resistance value of the thermistor. Thus, the set point voltage value, $V_{sp}$, will vary as a function of the battery pack ambient temperature just as the charging current set point value $I_{sp}$ does.

The A/D converter 294 generates digital values corresponding to the analog values for the amplified voltage drop, $V_{gsensor}$, of the sensor resistor 225 and the set point voltage value, $V_{sp}$. The digital values of $V_{gsensor}$ and $V_{sp}$ are input to the microprocessor 280. The microprocessor 280 compares the two digital values and takes one of the following actions depending on the comparison:

| Condition | Action |
| --- | --- |
| $V_{sp} < V_{gsensor}$ | Continue charging pack until 90% charge is achieved (stage 1) |
| $V_{sp} > V_{gsensor}$ | Actuate a timer 299 for 3 more hours of charging at $V_{max}$ to achieve 100% charge and actuate light emitting diode 275 (stage 2) |

If $V_{sp} < V_{gsensor}$, the charging current, $I_{charge}$, flowing through the battery pack 205 is at a level indicating that the battery pack is not yet charged to 90 to 95% of a fully charged condition and the microprocessor 280 will cause the charging circuitry 210 to continue charging the pack in stage 1 of the charging process. When $V_{sp} > V_{gsensor}$, the charging current, $I_{charge}$, flowing through the battery pack 205 has decreased to the charging current set point value, $I_{sp}$, and the Li-Ion battery pack 205 is 90–95% charged and stage 1 of the charging process has ended and stage 2 will commence. Because of the thermistor 290 in the voltage divider circuit 298, as the temperature of the battery pack 205 decreases, the value of the set point voltage value, $V_{sp}$, increases to account for the fact that the charging current, $I_{charge}$, and, therefore, $V_{gsensor}$ will necessarily decrease with decreasing battery pack temperature. Thus, by having a dynamic, temperature dependent set point voltage value, $V_{sp}$, the comparison between $V_{sp}$ and $V_{gsensor}$ remains a proper way to determine if the pack 205 has been charged to the 90–95% charge condition under various or even changing battery pack temperatures.

Upon sensing that $V_{sp} > V_{gsensor}$, the microprocessor 280 turns on the LED 275 to indicate to a user that the battery pack is charged to a 90–95% charged condition and is ready for reuse. Further, the microprocessor 280 sets the internal timer 299 to provide an additional three hours of charging of the battery pack 205 by the charging circuitry 210 at a charging voltage $V_{charge} = V_{max}$ to fully charge the battery pack 210. As shown, the microprocessor 280 is coupled to the charging circuitry 210 and controls actuation of the charging circuitry 210 in accordance with the results of the comparison described above.

Although this invention has been described with respect to the above two embodiments, it should be appreciated that alternative embodiments which do not depart from the spirit or scope of this invention also exist and are meant to be covered by the appended claims. For example, although the temperature sensors of the temperature sensor circuits in both embodiments are shown to be thermistors, alternative types of temperature sensors could readily be used. Further, the monitoring circuits disclosed in the two embodiments are shown to be part of circuitry external to the battery pack. However, it is also possible to include all, or a large portion, of this circuitry in a battery pack itself.

While the present invention has been described with a degree of particularity, it is the intent that the invention include all modifications and alterations from the disclosed design falling within the spirit and scope of the appended claims.

I claim:

1. A monitoring circuit for a battery pack charging apparatus comprising:
   a) a sensor resistor coupled between charging circuitry of the battery pack charging apparatus and a battery pack being charged by the charging circuitry, a voltage drop across the sensor resistor being proportional to a charging current through the battery pack;
   b) a voltage divider circuit coupled to the charging circuitry, the voltage divider circuit including a first resistor and a first thermistor coupled in series, a set point voltage being taken off a node of the voltage divider circuit between the first resistor and the first thermistor, the voltage divider circuit set point voltage varying as a function of battery pack temperature such that when a voltage across the battery pack exceeds the voltage divider circuit set point voltage, the battery pack has been charged to a charge condition of between 90 and 95 percent of a fully charged condition;
   c) a comparator, wherein the voltage across the battery pack is coupled to a first input of the comparator and the voltage divider circuit set point voltage is coupled to a second input of the comparator and an output state of the comparator changes when the voltage across the battery pack exceeds the voltage divider circuit set point voltage; and
   d) a second thermistor coupled in series between the first thermistor and ground and a diode coupled between an output of the comparator and a node between the first and second thermistors, an anode end of the diode being coupled to the node between the first and second thermistors and a cathode end of the diode being coupled to the output of the comparator.

2. A monitoring circuit for a battery pack charging apparatus comprising:
   a) a sensor resistor coupled between charging circuitry of the battery pack charging apparatus and a battery pack being charged by the charging circuitry, a voltage drop across the sensor resistor being proportional to a charging current through the battery pack;
   b) a voltage divider circuit coupled to the charging circuitry, the voltage divider circuit including a first resistor and a first thermistor coupled in series, a set point voltage being taken off a node of the voltage divider circuit between the first resistor and the first thermistor, the voltage divider circuit set point voltage varying as a function of battery pack temperature such that when a voltage across the battery pack exceeds the voltage divider circuit set point voltage, the battery pack has been charged to a charge condition of between 90 and 95 percent of a fully charged condition; and
   c) a timer coupled to the charging circuitry and wherein the timer is set when the voltage across the battery pack exceeds the voltage divider circuit set point voltage causing the charging circuitry to continue charging the battery pack for a predetermined time such that the battery pack is charged to a charge condition of substantially 100 percent of the fully charged condition.

3. The monitoring circuit of claim 1 further including an inverter coupled between the output of the comparator and an anode end of a light emitting diode, the light emitting diode being actuated when the comparator changes from a high voltage output state to a low voltage output state upon the voltage across the battery pack exceeding the voltage divider circuit set point voltage.

4. A monitoring circuit for a battery pack charging apparatus comprising:
   a) a sensor resistor coupled between charging circuitry of the battery pack charging apparatus and a battery pack being charged by the charging circuitry, a voltage drop across the sensor resistor being proportional to a charging current through the battery pack;
   b) a differential amplifier having two inputs coupled to opposite ends of the sensor resistor, the differential amplifier outputting an amplified voltage whose magnitude is proportional to the voltage drop across the sensor resistor; and
   c) a temperature sensor circuit generating a set point voltage, the set point voltage varying as a function of battery pack temperature such that when the set point voltage exceeds the magnitude of the amplified voltage output by the differential amplifier, the battery pack has been charged to a charge condition of between 90 and 95 percent of a fully charged condition.

5. The monitoring circuit of claim 4 wherein the temperature sensor circuit comprises a voltage divider circuit having a voltage potential applied to the circuit and including a first resistor and a first thermistor coupled in series, the set point voltage being taken off a node of the voltage divider circuit between the first resistor and the first thermistor.

6. The monitoring circuit of claim 4 further including a microprocessor and wherein digitized values corresponding to the set point voltage and amplified voltage output by the differential amplifier are input to the microprocessor and the microprocessor compares the digitized values corresponding to the set point voltage and the amplified voltage output by the differential amplifier to determine whether the set point voltage has exceeded the magnitude of the amplified voltage output by the differential amplifier.

7. The monitoring circuit of claim 6 further including an analog to digital converter coupled to the microprocessor and wherein the set point voltage and amplified voltage output by the differential amplifier are input to the analog to digital converter and are converted to the digitized values corresponding to the set point voltage and amplified voltage output by the differential amplifier.

8. The monitoring circuit of claim 7 wherein the voltage potential applied to the voltage divider circuit is a reference voltage taken off an of an output of the analog to digital converter.

9. The monitoring circuit of claim 5 wherein one end of the voltage divider first thermistor is coupled to one end of the first resistor and an other end of the first thermistor is grounded and further wherein the voltage potential is applied to an other end of the first resistor.

10. The monitoring circuit of claim 6 further including a timer coupled to the charging circuitry and wherein the timer is set when the set point voltage exceeds the magnitude of the amplified voltage output by the differential amplifier causing the charging circuitry to continue charging the battery pack for a predetermined time such that the battery pack is charged to a charge condition of substantially 100 percent of the fully charged condition.

11. The monitoring circuit of claim 10 wherein the timer is internal to the microprocessor.

12. The monitoring circuit of claim 4 further including a light emitting diode which is actuated when the set point voltage exceeds the magnitude of the amplified voltage output by the differential amplifier to provide a visual indication that the battery pack is charged to a charge condition of 90 to 95 percent of the fully charged condition.

13. The monitoring circuit of claim 8 wherein the reference voltage is a +5 volt voltage.

14. A battery recharging apparatus comprising:
a) charging circuitry coupled to an external power supply and outputting a regulated source of power to charge a battery pack inserted into the apparatus for charging; and
b) a monitoring circuit coupled to the charging circuit and the battery pack, the monitoring circuit including:
i) a sensor resistor coupled between charging circuitry of the battery pack charging apparatus and a battery pack being charged by the charging circuitry, a voltage drop across the sensor resistor being proportional to a charging current through the battery pack;
ii) a differential amplifier having two inputs coupled to opposite ends of the sensor resistor, the differential amplifier outputting an amplified voltage whose magnitude is proportional to the voltage drop across the sensor resistor; and
iii) a voltage divider circuit having a voltage potential applied to the circuit and including a first resistor and a first thermistor coupled in series, a set point voltage being taken off a node of the voltage divider circuit between the first resistor and the first thermistor, the voltage divider circuit set point voltage varying as a function of battery pack temperature such that when the set point voltage exceeds the magnitude of the amplified voltage output by the differential amplifier, the battery pack has been charged to a charge condition of between 90 and 95 percent of a fully charged condition.

* * * * *